(12) United States Patent
Tsakonas et al.

(10) Patent No.: US 8,599,901 B2
(45) Date of Patent: Dec. 3, 2013

(54) METHOD AND APPARATUS FOR TRACKING A FREQUENCY-HOPPED SIGNAL

(75) Inventors: Efthimios E. Tsakonas, Keratsinion (GR); Nikolaos D. Sidiropoulos, Kambani (GR); Ananthram Swami, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 874 days.

(21) Appl. No.: 12/753,936

(22) Filed: Apr. 5, 2010

(65) Prior Publication Data

US 2011/0243192 A1   Oct. 6, 2011

(51) Int. Cl.
*H04B 1/713* (2011.01)

(52) U.S. Cl.
USPC .................................. 375/136; 375/E1.033

(58) Field of Classification Search
USPC .................................. 375/132–137, E1.033
See application file for complete search history.

(56) References Cited

U.S. PATENT DOCUMENTS

| | | | |
|---|---|---|---|
| 4,843,638 A | 6/1989 | Walters | |
| 4,985,899 A | 1/1991 | Walsh | |
| 5,239,555 A | 8/1993 | Konig | |
| 5,440,636 A | 8/1995 | Herrick | |
| 7,035,311 B2 | 4/2006 | Nohara et al. | |
| 2005/0190868 A1* | 9/2005 | Khandekar et al. | 375/346 |
| 2007/0297521 A1* | 12/2007 | Guo et al. | 375/260 |

OTHER PUBLICATIONS

M.S. Arulampalam, S. Maskell, N. Gordon, T. Clapp, "A Tutorial on Particle Filters for Nonlinear/Non-Gaussian Bayesian Tracking," IEEE Trans. Signal Processing, vol. 50, No. 2, pp. 174-188, Feb. 2002.
L Aydin and A. Polydoros, "Hop-timing Estimation for FH Signals Using a Coarsely Channelized Receiver," IEEE Trans. Communcations, vol. 44, No. 4, pp. 516-526, Apr. 1996.
S. Barbarossa and A. Scaglione, "Parameter Estimation of Spread Spectrum Frequency-hopping Signals Using Time-frequency Distributions," in Proc. Int. Workshop Signal Proc. Advances in Wireless Communications (SPAWC'97), pp. 213-216, Apr. 1997.
P. Djuric, J.H. Kotecha, J. Zhang, Y. Huang, T. Ghirmai, M. Bugallo, J. Miguez, "Particle Filtering,", IEEE Signal Processing Magazine, pp. 19-38, Sep. 2003.

(Continued)

*Primary Examiner* — Shuwang Liu
*Assistant Examiner* — David Huang
(74) *Attorney, Agent, or Firm* — Lawrence E. Anderson

(57) ABSTRACT

A frequency hopping signal receiving system comprising: a receiver for extracting discrete-time samples from the signal; a memory connected to the receiver for storing the extracted discrete-time samples from the signal; at least one processor operatively connected to the memory for: determining a state-space vector that captures relevant information to describe the dynamics of the signal; selecting a parameter to represent the probability of hopping associated with the signal; generating particle filters to estimate unknown parameters in the state-space vector based upon the extracted discrete-time samples by generating random particles that approximate the filtering distribution having importance weights; specifying the importance function in closed-form in a convenient mixture representation, which enables drawing particles and updating the importance weights; constructing an estimator to generate hop particles based upon observing at least one sample hop and then evaluating the estimator using a conditional expected value; using a spectrogram to generate particles in conjunction with an importance function; and estimating the hop frequency, hop time, and amplitude parameters, and a method thereof.

15 Claims, 8 Drawing Sheets

(56) References Cited

OTHER PUBLICATIONS

A. Doucet, S.J. Godsill, and C. Andrieu, "On sequential Monte Carlo sampling methods for Bayesian filtering," Statistics and Computing, vol. 10, No. 3, pp. 197-208, 2000.

A. Doucet, N. Gordon, and V. Krishnamurthy, "Particle filters for state estimation of jump Markov linear systems," IEEE Trans. on Signal Processing, vol. 49, No. 3, pp. 613-624, Mar. 2001.

A. Doucet, X. Wang, "Monte Carlo Methods for Signal Processing: A Review in the Statistical Signal Processing Context", IEEE Signal Processing Magazine, vol. 22, No. 6, pp. 152-170, Nov. 2005.

N. J. Gordon, D. J. Salmond, and A. F. M. Smith, "Novel approach to nonlinear/non-Gaussian Bayesian state estimation," IEE Proceedings- F, vol. 140, No. 2, pp. 107-113, 1993.

X. Liu, N. D. Sidiropoulos, and A. Swami, "Blind High Resolution Localization and Tracking of Multiple Frequency Hopped Signals," IEEE Trans. Signal Processing, vol. 50, No. 4, pp. 889-901, Apr. 2002.

X. Liu, N. D. Sidiropoulos, and A. Swami, "Joint Hop Timing and Frequency Estimation for Collision Resolution in Frequency Hopped Networks," IEEE Trans. Wireless Communications, vol. 4, No. 6, pp. 3063-3074, Nov. 2005.

T. Schon, F. Gustafsson, and P.-J. Nordlund, "Marginalized particle filters for mixed linear/nonlinear state-space models," IEEE Trans. on Signal Processing, vol. 53, No. 7, pp. 2279-2289, Jul. 2005.

N.D. Sidiropoulos, A. Swami, A. Valyrakis, "Tracking a Frequency Hopped Signal Using Partical Filtering," in Proc. IEEE ICASSP 2006, May 14-19, 2006, Toulouse, France, pp. III-25 to III-28.

M. K. Simon, U. Cheng, L. Aydin, A. Polydoros, and B. K. Levitt, "Hop Timing Estimation for Noncoherent Frequency-hopped M-FSK Intercept Receivers," IEEE Trans. Communications, vol. 43, No. 2/3/4, pp. 1144-1154, Feb./Mar./Apr. 1995.

E. Tsakonas, N.D. Sidiropoulos, A. Swami, "Time-Frequency Analysis Using Particle Filtering: Closed-form Optimal Importance Function and Sampling Proceedure for a Single Time-varying Harmonic," in Proc. Nonlinear Statistical Signal Processing Workshop: Classical, Unscented, and Particle Filtering Methods, Sep. 13-15, 2006, Corpus Christi College, Cambridge, U.K.

E. Tsakonas, N.D. Sidiropoulos, A. Swami, "Optimal Particle Filters for Tracking a Time-Varying Harmonic or Chirp Signal," IEEE Trans. Signal Processing, vol. 56, No. 10, pp. 4598-4610, Oct. 2008.

A. Valyrakis, N.D. Sidiropoulos, A. Swami, "Multichannel Particle Filtering for Tracking a Frequency Hopped Signal," in Proc. IEEE CAMSAP 2007, Dec. 12-14, 2007, St. Thomas, U.S. Virgin Islands, pp. 253-256.

A. Valyrakis, E. Tsakonas, N.D. Sidiropoulos, A. Swami, "Stochastic Modeling and Particle Filtering Algorithms for Tracking a Frequency-Hopped Signal", IEEE Trans. on Signal Processing, 57(8):3108-3118 Aug. 2009.

* cited by examiner

US 8,599,901 B2

METHOD AND APPARATUS FOR TRACKING A FREQUENCY-HOPPED SIGNAL

STATEMENT OF GOVERNMENT INTEREST

The embodiments herein may be manufactured, used, and/or licensed by or for the United States Government without the payment of royalties thereon.

COMPUTER LISTING

A computer listing is set forth in Appendix A.

BACKGROUND OF THE INVENTION

Frequency-hopping is a method of transmitting radio signals where the carrier wave is sequentially switched among many frequency channels, using a sequence known to both transmitter and receiver. Generally speaking, an eavesdropper is only able to intercept the transmission if the sequence is known. An advantage of spread spectrum frequency hopping is that such transmissions can share a frequency band with many types of conventional transmissions with minimal interference. The spread-spectrum signals add minimal noise to the narrow-frequency communications, and vice versa; resulting in more efficient bandwidth utilization. Since they do not raise the noise floor appreciably, they are difficult to detect by an uninformed adversary. Another advantage of spread-spectrum signals is that they are highly resistant to deliberate jamming, unless the jammer knows the characteristics of the spreading. Military radios use cryptographic techniques to generate the channel sequence under the control of a secret key that the sender and receiver share.

The capability to track a frequency-hopped signal without knowledge of its hopping pattern is useful in intelligence operations. The problem is of interest in military communications, where, in addition to frequency, hop timing can also be randomly shifted to guard against unauthorized reception and jamming. Tracking the time-varying parameters (frequency, complex amplitude) of a complex sinusoid is an important problem that arises in numerous applications. In many cases the parameters can be assumed to vary slowly in time; in frequency hopping (FH) communications, however, the carrier frequency is intentionally hopped in a (pseudo-) random and discontinuous fashion. In military communications, frequency hopping (FH) is used to guard against unauthorized reception and jamming, and hop timing can also be randomized for added protection. In civilian communications (e.g., Bluetooth), FH is used to avoid persistent interference and enable uncoordinated coexistence with other systems.

Several researchers have considered the problem of tracking a frequency hopping (FH) signal without knowledge of the hopping pattern, including L. Aydin and A. Polydoros, "Hop-timing Estimation for FH Signals Using a Coarsely Channelized Receiver," *IEEE Trans. Communications*, vol. 44, no. 4, pp. 516-526, April 1996 (hereinafter *Aydin* 1996; hereby incorporated by reference); S. Barbarossa and A. Scaglione, "Parameter Estimation of Spread Spectrum Frequency-hopping Signals Using Time-frequency Distributions," in Proc. IEEE Int. Workshop Signal Proc. Advances in Wireless Communications (SPAWC '97), pp. 213-216, (April 1997) (hereinafter *Barbarossa* 1997; hereby incorporated by reference), X. Liu, N. D. Sidiropoulos, and A. Swami, "Blind High Resolution Localization and Tracking of Multiple Frequency Hopped Signals," IEEE Trans. Signal Processing, vol. 50, no. 4, pp. 889-901, (April 2002) (hereinafter *Liu* 2002, hereby incorporated by reference), X. Liu, N. D. Sidiropoulos, and A. Swami, "Joint Hop Timing and Frequency Estimation for Collision Resolution in Frequency Hopped Networks," IEEE Trans. Wireless Communications, vol. 4, no. 6, pp. 3063-3074, (November 2005) (hereinafter *Liu* 2005; hereby incorporated by reference), M. K. Simon, U. Cheng, L. Aydin, A. Polydoros, and B. K. Levitt, "Hop Timing Estimation for Noncoherent Frequency-hopped M-FSK Intercept Receivers," IEEE Trans. Communications, vol. 43, no. 2/3/4, pp. 1144-1154, (February/March/April 1995) (hereinafter *Simon* 1995; hereby incorporated by reference). Non-parametric methods based on the spectrogram in *Aydin* 1996 and *Simon* 1995 are simple and useful as exploratory tools, but suffer from limited resolution due to leakage. It is possible to employ time-frequency distributions that are better-adapted to frequency hopping as disclosed in *Barbarossa* 1997, but the results are still not very satisfactory. Parametric methods for frequency hopping explicitly model the frequency as piecewise-constant, assume a "budget" on the number of hops within a given observation interval, and employ Dynamic Programming (DP) to track the sought frequency and complex amplitude parameters (as described further in *Liu* 2002 and *Liu* 2005). Other than an upper bound on the number of hops, the methods in *Liu* 2002 and *Liu* 2005 do not assume anything else about the frequencies or complex amplitudes, which are treated as deterministic unknowns. The algorithms in *Aydin* 1996, *Liu* 2002, *Liu* 2005, and *Simon* 1995 are also applicable when hop timing is random. The approaches in *Liu* 2002, *Liu* 2005 are not suitable for on-line implementation: their complexity is roughly fourth-order polynomial in the number of temporal samples, and dynamic programming requires back-tracking—implying that only short data records can be processed, and in batch mode. The approaches in *Aydin* 1996 and *Simon* 1995 are based on the use of coarse channelization—which is a useful approach for initial exploration; however it suffers from significant limitations in terms of time-frequency localization (the so-called Fourier uncertainty principle). In practice this means that the dwell frequencies are not accurately estimated and hops are often missed.

By way of background, particle filtering (PF) is an important estimation methodology that is applicable to general stochastic non-linear and/or non-Gaussian state-space models. Particle filters, also known as sequential Monte Carlo methods (SMC), are sophisticated signal and model estimation techniques based on simulation.

It is noted that particle filtering solutions for tracking slowly varying parameters of a harmonic or chirp signal are discussed in E. Tsakonas, N. D. Sidiropoulos, A. Swami, "Time-Frequency Analysis Using Particle Filtering: Closed-form Optimal Importance Function and Sampling Procedure for a Single Time-varying Harmonic," IEEE Explore Digital Library, Nonlinear Statistical Signal Processing Workshop, 13-15 Sep. (2006) (hereinafter *Tsakonas* 2006; hereby incorporated by reference), and E. Tsakonas, N. D. Sidiropoulos, A. Swami, "Optimal Particle Filters for Tracking a Time-Varying Harmonic or Chirp Signal," IEEE Trans. Signal Processing, vol. 56, no. 10, pp. 4598-4610, (October 2008) (hereinafter *Tsakonas* 2008; hereby incorporated by reference). Interestingly, the case of slowly varying parameters is much different, and in a sense more difficult. In particular, the divergence phenomenon encountered in *Tsakonas* 2006 and *Tsakonas* 2008 is not present in the case of frequency hopping (FH).

U.S. Pat. No. 7,035,311, hereby incorporated by reference, discloses a signal intercept and analysis processor for a wideband intercept receiver system including at least one wideband receiver with a signal detector operatively connectable to the wideband receiver and a signal extractor operatively connected to the signal detector and connectable to the wideband receiver for performing signal extraction directly on a wideband signal output of the receiver and for performing the signal extraction only upon detection of a signal by the signal detector. The signal detector includes a generator of a coarsely sampled or decimated time-frequency representation of the wideband signal output. The time-frequency representation is decimated or coarsely sampled in time compared to an inverse frequency filter bandwidth used in the time-frequency representation. The generator preferably includes a digital filter bank. The digital filter bank in turn may include means for performing a sequence of windowed FFTs on samples of the wideband signal output, wherein a stride between consecutive one of the FFTs is considerably larger than a length of each of the FFTs.

U.S. Pat. No. 5,239,555, hereby incorporated by reference, discloses a frequency hopping interceptor for determining bandwidth, hop number, dwell time, hop channel spacing and hop frequencies. A compressive receiver, having a passband greater than the bandwidth, samples received signals at a scan rate greater than the hop rate. On each scan, the receiver separates the received signal into its frequency components. A histogram memory, connected to the receiver, stores a frequency distribution of the frequency components including the scan periods. A data processor uses the histogram memory to determine the FH parameters.

SUMMARY OF THE INVENTION

A preferred embodiment of the present invention comprises a stochastic non-linear, non-Gaussian state-space formulation which captures frequency hopping dynamics in a probabilistic sense. The formulation is naturally well-suited for the application of particle filtering for state estimation. The preferred embodiment approach has a number of desirable features. Particle filtering can be implemented on-line, and its complexity is linear in the number of temporal signal snapshots (T). Furthermore, unlike previous methods, the stochastic state-space model can be easily tailored to match a given scenario (e.g., spread bandwidth and modulation).

A preferred embodiment comprises utilizing a nonlinear and non-Gaussian stochastic state-space model to capture the randomness in carrier frequency and hop timing. A systematic design approach can be pursued to compute the optimal (weight variance-minimizing) importance function in closed-form. A convenient mixture representation of the latter may be employed together with Rao-Blackwellization to derive an optimal sampling procedure. A heuristic design approach may also be utilized, using the mode of the spectrogram to localize hop particles. Performance is assessed in a range of experiments using both simulated and measured data. The results indicate that the heuristic design approach may outperform the systematic one, and both are robust to model assumptions.

A preferred embodiment addresses the problem of tracking a frequency-hopped signal of random dwell frequency and hop timing, when only the average hop rate and spread bandwidth are known to the receiver. This problem is of interest in military communications, where, in addition to dwell frequency, hop timing can also be randomly shifted to guard against unauthorized reception and jamming. The ability to track such a signal has important implications for signal intelligence. Additional applications can be found in the context of transmitter-receiver synchronization for frequency-hopping subject to (unintentional) timing jitter. The invention also has implications for commercial radio designs, particularly in the context of software radio and cognitive radios, where frequency and dwell timing are not a priori fixed.

In a preferred embodiment, the judicious engineering design of the importance (also known as proposal) function is employed to draw particles, and the associated weighting scheme. In particular, a preferred embodiment uses the mode of the spectrogram to draw localized hop particles in conjunction with a custom particle weighting scheme, thereby yielding highly accurate hop timing and dwell frequency estimates.

Implementation of a preferred embodiment can be on-line, and its complexity is linear in the number of temporal samples, which means that long sequences can be processed. The preferred embodiment yields high-resolution estimates in terms of both hop timing and dwell frequency.

BRIEF DESCRIPTION OF THE DRAWINGS

FIG. 4A illustrates the observed signal;

FIG. 4B illustrates the tracking performance using the Optimal Importance Function (OIF) and Rao-Blackwellised Particle Filtering (RBPF) for T=500, h=0.01, and 1000 particles for each filter;

FIG. 4C illustrates the tracking performance using the Auxiliary SPECTrogram Particle Filter (ASPECT-PF)-C (Causal version)(window length 4) for T=500, h=0.01, and 1000 particles for each filter;

FIG. 4D illustrates the tracking performance using the Auxiliary SPECTrogram Particle Filter, Noncausal version (ASPECT-PF-NC) (window length 8) (FIG. 4D), for T=500, h=0.01, and 1000 particles for each filter.

DETAILED DESCRIPTION OF PREFERRED EMBODIMENTS

Figure 1:
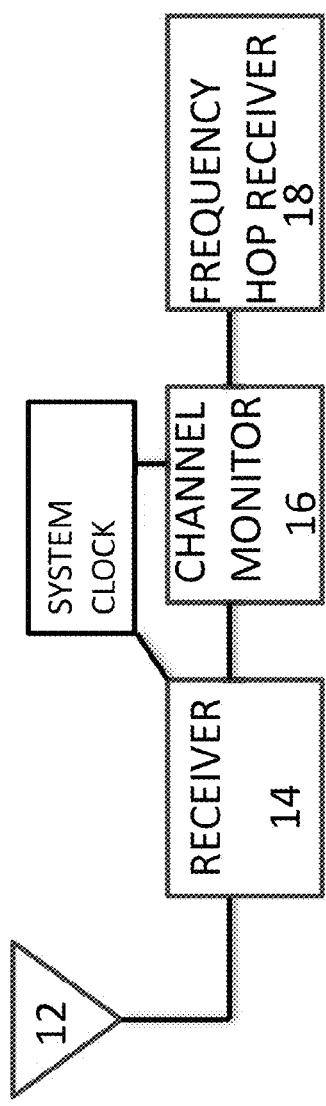
FIG. 1 is a schematic block diagram of an exemplary system for receiving a frequency hopped signal.

A preferred embodiment is directed to the problem of tracking a frequency-hopped signal of random dwell frequency and hop timing, when only the average hop rate and spread bandwidth are known to the receiver. A preferred embodiment is particularly useful in intercepting military communications, where, in addition to dwell frequency, hop timing can also be randomly shifted to guard against unauthorized reception and jamming. Additional applications can be found in the context of transmitter-receiver synchronization for frequency-hopping subject to (unintentional) timing jitter, and in cognitive radio where carrier frequency can be switched depending on spectrum occupancy and interference conditions. Starting from a parsimonious stochastic state-space model, custom particle filtering solutions have been developed for the tracking problem at hand, based on systematic design principles. A preferred embodiment heuristic design is disclosed, which turns out to outperform systematic designs in terms of robustness to model mismatch, flexibility, and tracking performance when a small decoding delay can be tolerated. This preferred embodiment heuristic design, called Auxiliary SPECTrogram Particle Filter (ASPECT-PF), uses the mode of the spectrogram to draw localized hop particles in conjunction with a custom particle weighting scheme, yielding highly accurate hop timing and dwell frequency estimates. Experiments have validated the excellent tracking performance and robustness to model mismatch of ASPECT-PF.

A preferred embodiment of the present invention comprises a stochastic non-linear, non-Gaussian state-space formulation which captures frequency hopping dynamics in a probabilistic sense. The formulation is naturally well-suited for the application of particle filtering for state estimation. Compared to the prior state-of-art systems disclosed in *Liu* 2002 and *Liu* 2005, the preferred embodiment approach has a number of desirable features. For a fixed average hop rate, the complexity of the dynamic programming (DP) algorithms disclosed in *X. Liu* 2002 and *X. Liu* 2005 is roughly fourth-order polynomial in the number of temporal signal snapshots (T), and dynamic programming (DP) requires back-tracking—implying that only short data records can be processed, and in batch mode. Particle filtering can be implemented on-line, and its complexity is linear in T (number of temporal signal snapshots). Furthermore, unlike previous methods, the stochastic state-space model can be easily tailored to match a given scenario (e.g., spread bandwidth and modulation).

As mentioned above, particle filtering solutions for tracking slowly-varying parameters of a harmonic or chirp signal are discussed in *Tsakonas* 2006 and *Tsakonas* 2008. However, the case of slowly-varying parameters is much different, and in a sense more difficult than that utilized in a preferred embodiment. In particular, the divergence phenomenon encountered in *Tsakonas* 2006 and *Tsakonas* 2008 is not present in the case of frequency hopping (FH).

Similar to that disclosed in U.S. Pat. No. 5,239,555, hereby incorporated by reference, FIG. 1 discloses a frequency hopping signal interceptor system 10 for determining bandwidth, hop number, dwell time, channel spacing and hop frequencies comprising an antenna 12 and compressive receiver 14. The receiver 14 has a passband greater than the bandwidth and receives signal samples at a scan rate greater than the hop rate. Memory 22, operatively connected to the receiver 14, stores a frequency distribution of the frequency components including the scan periods. The RAM and ROM portions of memory 22 are represented by RAM 22A and ROM 22B, however, the representations are symbolic in that the RAM 22A and ROM 22B portions may be intermingled and are not intended to be limited to two separate portions. A data processor 24 uses the memory 22 to determine the frequency hopping parameters. The FH receiver 18 uses the FH parameters to intercept and decode the FH transmissions. The compressive receiver 14, preferably of conventional configuration, will typically employ a dispersive delay line and a scanning circuit that will sample the output of antenna 12 at a relatively fast scan rate. The dispersive delay line will separate each of the sampled signals into its frequency components by delaying each frequency component a different amount of time. FIG. 1 is merely an example of a frequency hopping signal interceptor system 10 and the present invention is not limited to the specific configuration disclosed herein.

Figure 3:
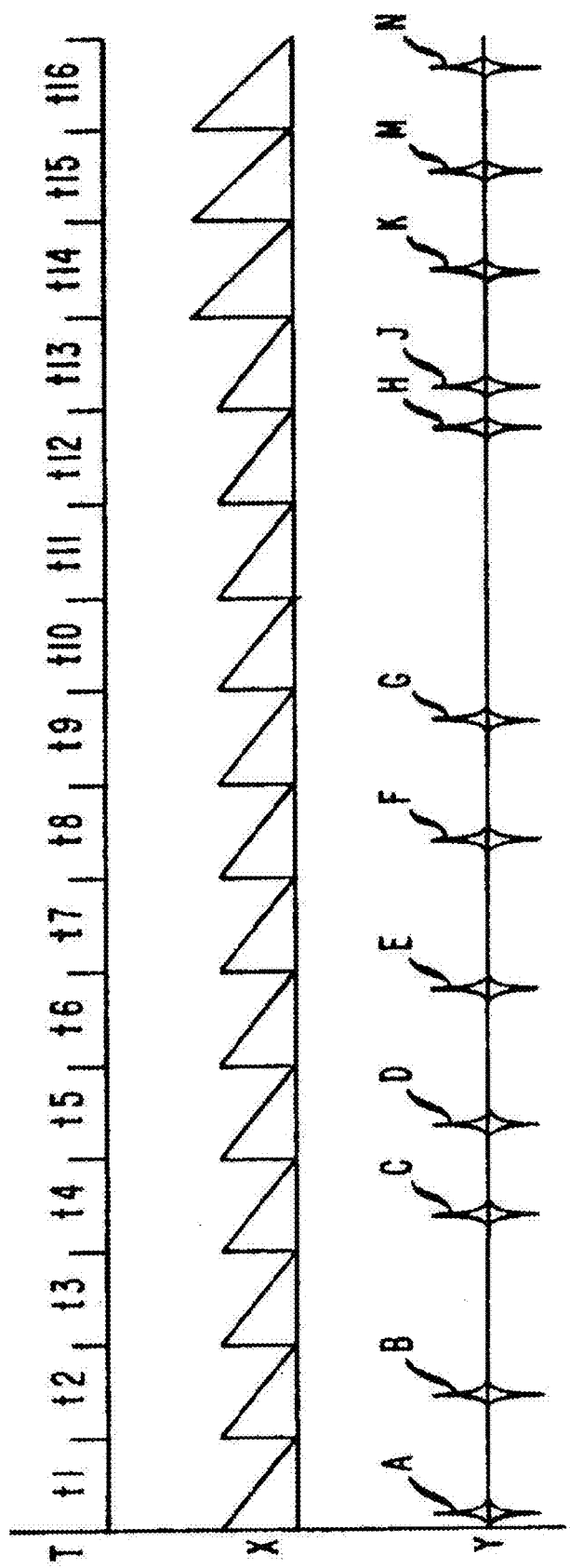
FIG. 3 is a graph of waveforms useful in understanding the concepts of a frequency hopped signal.

As depicted in FIG. 3, an exemplary waveform X illustrates the scan signal of receiver 14 over the time periods T. Waveform Y illustrates a typical output of receiver 14, showing a series of detected frequency components A-N. It is noted that the location of each of the frequency components A-N in its respective time period T will be a function of its frequency. For example, the location of the frequency component A in the time period t1 will indicate the value of the frequency of the component A. Component B, which is located near the center of time period t2, will represent a different frequency than that represented by component A which is located near the start of time period t2. It is noted that for the example illustrated in FIG. 3, the rf signal being intercepted by receiver 22 has no frequency components during time periods t3, t7, t10 and t11.

Figure 2:
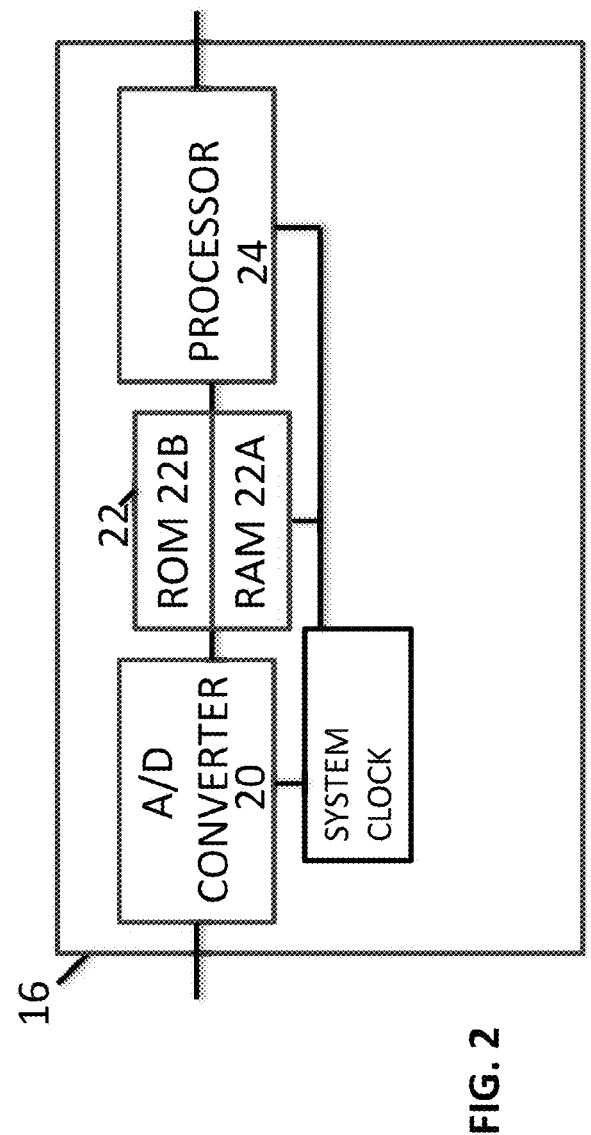
FIG. 2 is a schematic block diagram of a portion of the exemplary system depicted in FIG. 1.

The channel monitor 16, a data processor system, receives the waveform Y, converts it into appropriate digital data and analyzes the data to extract the rf hop frequencies (Fi), number of frequencies (n), bandwidth (BW), hop rate (H), dwell time, tone spacing (S) and hop number. Monitor 16, shown in FIG. 2, includes an analog-to-digital (A/D) converter 20. The output of receiver 14 (waveform Y) is inputted to A/D 20 which converts each of the frequency components A-N into a digital word representative of the frequency (Fi). The A/D 20 may be implemented using a memory 22 comprising a read only memory (ROM) 22ROM with a frequency look-up table. The A/D 20, using the time of arrival of the frequency components A-N in their respective time periods T as indicated by the system clock, will output a frequency word from the ROM for each component A-N. The output of A/D 20 is fed to the input of a random access memory portion of memory 22 (RAM 22). The system clock is also fed to RAM 22.

Tracking the carrier frequency of a frequency-hopped signal without knowledge of its hopping pattern is a challenging problem that is further compounded when the transmitter intentionally randomizes hop timing in addition to dwell frequency. A preferred embodiment provides an effective way of tracking such a signal when only the average hop rate and spread bandwidth are known to the intercept receiver; based on a parsimonious stochastic state-space model of the frequency hopping process, and particle filtering principles. Important features of a preferred embodiment include the judicious engineering design of the importance (also known as proposal) function that is employed to draw particles, and the associated weighting scheme. In particular, a preferred embodiment of the present invention uses the mode of the spectrogram to draw localized hop particles in conjunction with a custom particle weighting scheme, thereby yielding highly accurate hop timing and dwell frequency estimates. A detailed description of a preferred embodiment of the present invention and the specific preferred embodiments will be provided after a brief introduction/review of the problem area, which will set the stage and the notation for full disclosure of the technical aspects of the invention.

The state-space approach to time-series modeling focuses attention on the state vector of a system. The state vector contains all relevant information required to describe the system under investigation. Let $x_k := [\omega_k, A_k]'$ denote the state at time k, where $\omega_k \in [-\pi, \pi)$ denotes the instantaneous frequency. $A_k \in \mathbb{C}$ denotes the instantaneous complex amplitude of the received signal, and an apostrophe (') is used to denote transposition (to avoid ambiguity with T, which is reserved for the number of temporal snapshots). Let $u_k := [b_k, \omega_k, A_k]'$ denote an auxiliary independent and identically distributed (i.i.d.) sequence of vectors with independent components and the following marginal statistics: $b_k$ is a binary random variable with $\Pr(b_k=1)=h$; $\omega_k$ is uniformly distributed in $[-\pi,\pi)$, denoted $\omega_k \sim Y(|-\pi,\pi))$; and $A_k \sim CN(0, 2\sigma_A^2)$, i.e., complex circular zero-mean Gaussian of total variance $2\sigma_A^2$. The state is assumed to evolve according to the following stochastic model:

$$x_k = f(x_{k-1}, u_k)$$

$$= \begin{cases} x_{k-1}, & u_k(1) = 0 \\ [u_k(2), u_k(3)]; & u_k(1) = 1 \end{cases}$$

$$= \begin{cases} x_{k-1}, & w.p. 1-h \\ [U([-\pi, \pi)), CN(0, 2\sigma_A^2)]; & w.p. h \end{cases}$$

while the measurement at time k is given by $$y_k = x_k(2)\exp(jx_k(1)k) + v_k,$$

where $v_k$ denotes the independent and identically distributed $CN(0, 2\sigma_n^2)$ measurement noise.

Modeling assumptions used in a preferred embodiment are as follows:

Hops are modeled as random, independent and identically distributed (i.i.d.) variables. In probability theory and statistics, a sequence or other collection of random variables is said to be independent and identically distributed (i.i.d.) if each random variable has the same probability distribution as the others (in our specific context this means that the hop probability is h for each sample interval) and all random variables are mutually independent. This is different from traditional models of frequency hopping, which assume that the frequency hops periodically. The random hopping model is i) well-motivated for military communications, ii) well-suited for on-line sequential estimation using particle filtering, and iii) the resulting algorithms can also track periodically hopped signals, as we will see in experiments with measured data.

When the (discrete-time, baseband-equivalent) frequency hops, it hops anywhere within $[-\pi,\pi)$ with a uniform density. This is appropriate for FH signals sampled at the Nyquist rate relative to the hopping bandwidth. Partial-band hopping can be easily accommodated.

Modulation-induced variations can be neglected when the objective is to estimate carrier frequency, but could also be explicitly modeled using, e.g., a smooth auto-regressive frequency variation model in-between hops, in lieu of the simplified constant model postulated above.

It is assumed that the fading process is i.i.d. Rayleigh in space and frequency. Rayleigh fading is a statistical model for the effect of a propagation environment on a radio signal, such as that used by wireless devices. Rayleigh fading models assume that the magnitude of a signal that has passed through such a transmission medium (also called a communications channel) will vary randomly, or fade, according to a Rayleigh distribution—the radial component of the sum of two uncorrelated Gaussian random variables. Assuming Rayleigh fading is realistic for frequency-hopped signals in rich multipath environments without a dominant line-of-sight. Aside from plausibility, this assumption is also convenient for tractability considerations.

Given a sequence of observations $\{y_k\}_{k=1}^T$, the objective is to estimate the sequence of system states $\{x_k\}_{k=1}^T$—that is, the unknown carrier frequencies and complex amplitudes. This is done in an indirect way-estimating the posterior density $p(x_k | \{y_l\}_{l=1}^k)$, from which the state can be estimated using the conditional mean. This leads us to particle filtering.

Particle filtering (PF) is an important estimation methodology that is applicable to general stochastic non-linear and/or non-Gaussian state-space models, such as the one considered herein. For a further overviews of particle filtering, see M. S. Arulampalam, S. Maskell, N. Gordon, T. Clapp, "A Tutorial on Particle Filters for Nonlinear/Non-Gaussian Bayesian Tracking," IEEE Trans. Signal Processing, vol. 50, no. 2, pp. 174-188, (February 2002) (hereinafter *Arulampalam* 2002, hereby incorporated by reference) and P. Djuric, J. H. Kotecha, J. Zhang, Y. Huang, T. Ghirmai, M. Bugallo, J. Miguez, "Particle Filtering,", IEEE Signal Processing Magazine, pp. 19-38, (September 2003), (hereinafter *Djuric* 2003, hereby incorporated by reference), and A. Doucet, X. Wang, "Monte Carlo Methods for Signal Processing: A Review in the Statistical Signal Processing Context", IEEE Signal Processing Magazine, vol. 22, no. 6, pp. 152-170, (November 2005) (hereinafter *Doucet* 2005, hereby incorporated by reference).

Direct sampling from the desired posterior is not possible in most cases. As used herein, posterior probability of a random event is the conditional probability that is assigned after the relevant evidence is taken into account. For this reason, it is best to resort to importance sampling: samples are drawn from a suitable importance function that has the same support as the desired posterior, and weight is given to the particles according to the ratio of the two densities at the sample point. The choice of importance function is key—the more it resembles the desired density the better, but it should also facilitate easy sampling.

In particle filtering, continuous distributions are approximated by discrete random measures, comprising "particles" and associated weights. That is, a certain continuous distribution of interest, say p(x), is approximated as $$p(x) \approx \sum_{n=1}^{N} \omega_n \delta(x - x_n),$$

where $\delta( )$ denotes the Dirac delta functional. A useful simplification stemming from this approximation is that the computation of pertinent expectations and conditional probabilities reduces to summation, as opposed to integration. While this can also be accomplished via direct discretization over a fixed grid, the use of a random measure affords flexibility in adapting the particle locations to better fit the distribution of interest. Different types of particle filters may be applied to a given state-space model. The various particle filters primarily differ in the choice of so-called importance (or, proposal) function. Different importance functions yield different estimation performance-complexity trade-offs. From the viewpoint of minimizing the variance of the weights, the optimal importance function is given by $$p(x_k \mid x_{n,k-1}, y_k) = \frac{p(y_k \mid x_k)p(x_k \mid x_{n,k-1})}{\int_x p(y_k \mid x)p(x \mid x_{n,k-1})dx}$$

A common problem in particle filtering (PF) is degeneracy: the weights of all except a few particles become negligible after several iterations. This can be detected and corrected using resampling techniques. For a further discussion, see *Djuric* 2003, and *Doucet* 2005. The importance function that minimizes the variance of the weights (a precaution against degeneracy) is $$p(x_k \mid x_{n,k-1}, y_k) = \frac{p(y_k \mid x_k)p(x_k \mid x_{n,k-1})}{\int p(y_k \mid x)p(x \mid x_{n,k-1})dx}$$

This is often referred to as the optimal importance function, and it usually strikes a better estimation performance-complexity trade-off than other alternatives. Notice that the optimal importance function takes into account the latest measurement. The optimal importance function yields a consistent estimate of the desired density as the number of particles goes to infinity.

There are two obstacles to using the optimal importance function: it requires integration to compute the normalization factor (which is usually intractable); and sampling from it can be complicated. For our particular model, it turns out (see A. Valyrakis, E. Tsakonas, N. D. Sidiropoulos, A. Swami, "Stochastic Modeling and Particle Filtering Algorithms for Tracking a Frequency-Hopped Signal," IEEE Trans. on Signal Processing, Vol. 57, No. 8 (April 2009) (hereinafter *Valyrakis* 2009, hereby incorporated by reference)) that it is possible to derive the optimal importance function in closed form. Furthermore, it was shown in *Valyrakis* 2009 (see for details) that it is possible to employ a convenient mixture representation together with Rao-Blackwellization to derive a very simple optimal sampling procedure. The focus of this disclosure is on an alternative design, based on engineering insight. The heuristic design, called Auxiliary SPECTrogram Particle Filter (ASPECT-PF), turns out to outperform systematic designs in terms of robustness to model mismatch, flexibility, and tracking performance when a small decoding delay can be tolerated. ASPECT-PF uses the mode of the spectrogram to draw localized hop particles in conjunction with a custom particle weighting scheme, yielding highly accurate hop timing and dwell frequency estimates.

Auxiliary SPECTrogram Particle Filtering (ASPECT-PF)

The use of the optimal (weight variance-minimizing) importance function coupled with Rao-Blackwellization is representative of the state-of-art in terms of systematic design of particle filters. Note, however, that the ultimate objective is a favorable balance of estimation (tracking) accuracy and complexity. Minimizing the variance of the weights often strikes a better accuracy-complexity trade-off than other particle filtering solutions, but this is not guaranteed.

One key open problem in particle filtering is the choice of importance function. Custom solutions may outperform systematic ones by insightful design of the importance function. This is presently more a matter of engineering art, rather than theory.

A preferred embodiment uses a short-window spectrogram estimator of the instantaneous frequency, and two adjacent dwells. So long as the spectrogram window is contained within a single dwell, its mode will be a good estimate of the corresponding carrier frequency. Transient effects come into play as the window crosses the hop between the two dwells, and then the mode catches up with the new carrier frequency. The idea is to draw from a narrow interval about the mode of the spectrogram with probability h, else copy the previous particle. As the window begins crossing a hop, new particles are drawn around the forthcoming carrier frequency; yet these particles are inconsistent with the present measurement. If $p(y_k|x_{n,k})$ is used to weigh the particles, new particles will be down-weighted relative to old particles. The situation reverses as the window crosses the hop: old particles are down-weighted relative to new particles.

Let $\hat{\omega}_k$ denote the mode of the spectrogram at time k, based on a causal window $\{y_{k-l+1}, \ldots, y_k\}$. The proposal function employed by ASPECT-PF is $$(1-h)\delta(\omega_k - \omega_{n,k-1})\delta(A_k - A_{n,k-1}) + hp(\omega_k)\frac{1}{2\pi\sigma_A^2}e^{-\frac{|A_k|^2}{2\sigma_A^2}},$$

$$p(\omega_k) := \frac{1}{\sqrt{2\pi}\,\sigma_S}e^{-\frac{(\omega_k - \hat{\omega}_k)^2}{2\sigma_S^2}},$$

with $\sigma_S$ small (set to $10^{-3}$ in our experiments). For this choice of importance distribution, the particle weight update is given by;

$$w_{n,k} \propto w_{n,k-1}p(y_k \mid x_{n,k}) \times \times \begin{bmatrix} (1-h)\delta(\omega_{n,k} - \omega_{n,k-1})\delta(A_{n,k} - A_{n,k-1}) + \\ \frac{h}{2\pi}\frac{1}{2\pi\sigma_A^2}e^{-\frac{|A_{n,k}|^2}{2\sigma_A^2}} \\ \hline (1-h)\delta(\omega_{n,k} - \omega_{n,k-1})\delta(A_{n,k} - A_{n,k-1}) + \\ hp(\omega_{n,k})\frac{1}{2\pi\sigma_A^2}e^{-\frac{|A_{n,k}|^2}{2\sigma_A^2}} \end{bmatrix}.$$

If $\omega_{n,k} \neq \omega_{n,k-1}$, and $A_{n,k} \neq A_{n,k-1}$ then $$\omega_{n,k} \propto \omega_{n,k-1}\frac{\sigma_S}{\sqrt{2\pi}}\exp\left(\frac{(\omega_{n,k} - \hat{\omega}_k)^2}{2\sigma_S^2}\right)p(y_k \mid x_{n,k}),$$

else the weight update becomes indefinite due to the Dirac deltas, and we use $$\omega_{n,k} \propto \omega_{n,k-1}\frac{\sigma_S}{\sqrt{2\pi}}p(y_k \mid x_{n,k}).$$

Performance can be further improved by using a short look-ahead (non-causal) window,
i.e. $\omega_k$ computed from $\{(y_k, \ldots, y_{k+l-1}\}$. This is often tolerable in applications for small l.

Experiments

In the Bayesian approach to dynamic state estimation, one attempts to construct the posterior probability density function (pdf) of the state based on all available information, including the set of received measurements. Since this pdf embodies all available statistical information, it may be said to be the complete solution to the estimation problem. In principle, an optimal (with respect to any criterion) estimate of the state may be obtained from the pdf. A measure of the accuracy of the estimate may also be obtained.

Particle filtering methods involving Sequential Importance Sampling (SIS) Algorithm in which the sequential importance sampling (SIS) algorithm is a Monte Carlo (MC)

method that forms the basis for sequential MC filters developed over the past decade may be applied when the state space is approximated to be discrete. The algorithms are optimal if and only if the underlying state space is truly discrete in nature. This sequential MC (SMC) approach is known variously as bootstrap filtering, the condensation algorithm, particle filtering, interacting particle approximations, and survival of the fittest. It is a technique for implementing a recursive Bayesian filter by MC simulations. The key idea is to represent the required posterior density function by a set of random samples with associated weights and to compute estimates based on these samples and weights. As the number of samples becomes very large, this MC characterization becomes an equivalent representation to the usual functional description of the posterior pdf, and the SIS filter approaches the optimal Bayesian estimate.

Experiments

In numerical experiments, the following particle filtering (PF) algorithms were compared:
  SIR: the standard Sampling Importance Resampling algorithm using the prior importance function (for a further description see *Arulampalam* 2002)
  OIF-RBPF: using the Optimal Importance Function (OIF) and Rao-Blackwellization (*Valyrakis* 2009).
  [Auxiliary SPECTrogram Particle Filter] ASPECT-PF-C: the Causal (C) version, with spectrogram window length l=4 or l=8, zero-padding to 256 samples, and $\sigma_S=10^{-3}$.
  ASPECT-PF-NC: the Non-Causal (NC) version, with window length l=8 or l=16 and otherwise the same choice of parameters.

For the PF algorithms, the initial state was assumed known. This is reasonable for tracking applications, following initial acquisition. In all cases, resampling was used at each time step—in particular, the multinomial resampling (for a further description see N. J. Gordon, D. J. Salmond, and A. F. M. Smith, "Novel approach to nonlinear/non-Gaussian Bayesian state estimation," IEE Proceedings—F. vol. 140, no. 2, pp. 107-113, (1993) (hereinafter *Gordon* 1993; hereby incorporated by reference)) implementation of Arnaud Doucet and Nando de Freitas. Root Mean Square Error (RMSE) of frequency estimation was used as a performance measure.

Also included was a simple spectrogram estimator (SpE) as a baseline. For each time instant k, SpE computes the periodogram of $\{y_{k-l+1}, \ldots, y_k\}$ in the causal case or $\{y_k, \ldots, y_{k+l-1}\}$ in the non-causal case, and then finds its mode. Zero-padding to 256 samples was used for spectrogram estimator (SpE), as for the Auxiliary SPECTrogram Particle Filter (ASPECT-PF). Unlike ASPECT-PF, the causal and non-causal versions of spectrogram estimator (SpE) have the same performance—the non-causal version is equivalent to running the causal version backwards in time (time-reversal). SpE can be efficiently implemented by peak-picking a full-overlap factor rectangular-windowed spectrogram, requires minimal parameter tuning (choice of window length, l, which was manually optimized in the experiments), and is the first exploratory method that one would use in practice.

Experiments were conducted with simulated and measured data:
  The simulated data were generated using the model, and the particle filter (PF) algorithms utilized the correct model parameters. This is meant to assess the performance potential of the proposed algorithms under controlled conditions.
  Experiments were conducted using measured data which deviate significantly from our modeling assumptions.
The specific setups and associated results are presented next.

Simulations

For the simulated data, we used $\sigma_A^2=1$ and $\sigma_n^2=0.1$ to generate data and as model parameters for the PF algorithms for all cases considered.

Figure 4A:
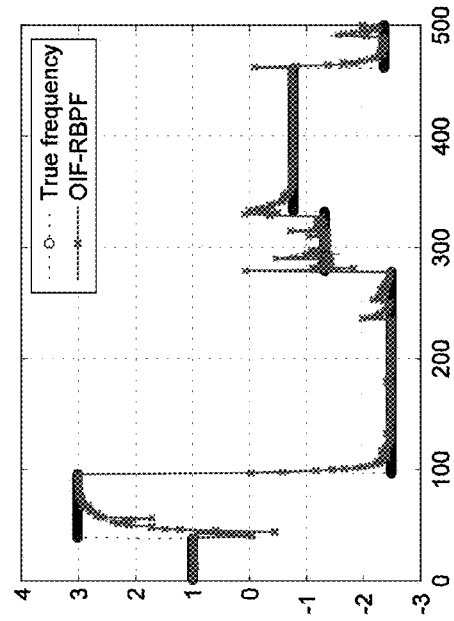
FIG. 4A-4D illustrate exemplary graphs of tracking performance for 1000 particles, T (number of temporal signal snapshots)=500, h=0.01 (h is hop probability per sample interval).
Figure 4B:
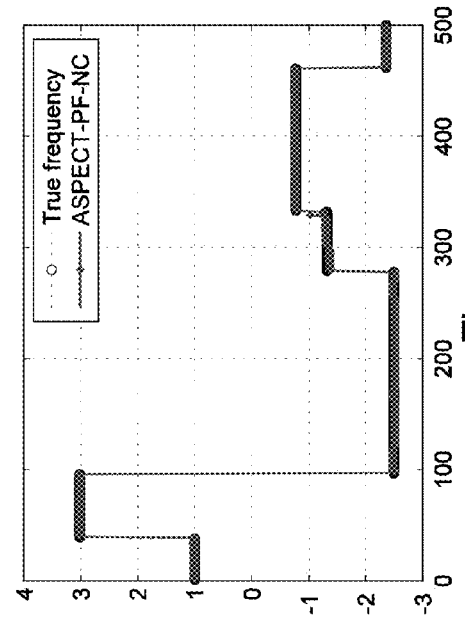
Figure 4C:
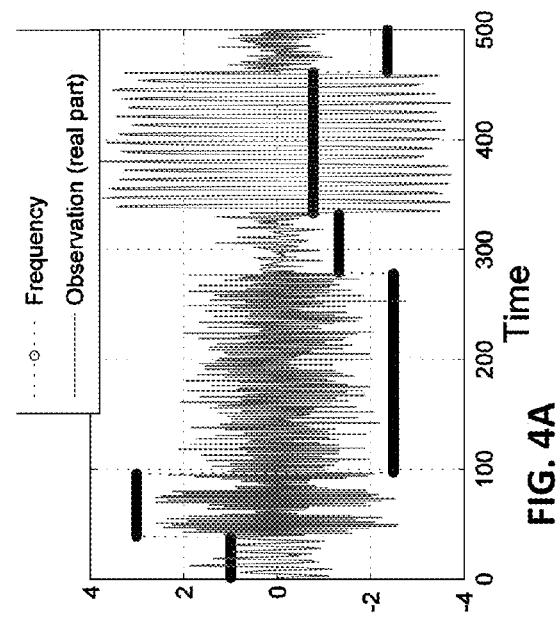
Figure 4D:
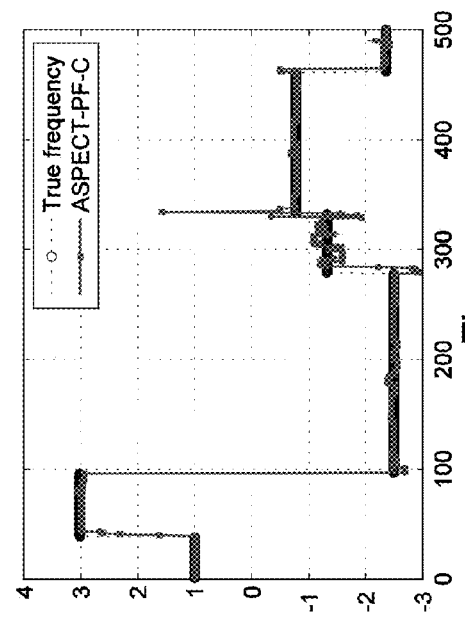

In order to illustrate the tracking capabilities of the different filters, FIG. 4 A-D shows typical tracks for (a) FIG. 4A illustrating the observed signal, (b) FIG. 4B illustrates using the Optimal Importance Function (Off) and Rao-Blackwellised Particle Filtering (RBPF), (c) FIG. 4C illustrates using the Auxiliary SPECTrogram Particle Filter (ASPECT-PF)-C (Causal version)(window length 4), and (d) FIG. 4D illustrates using the Auxiliary SPECTrogram Particle Filter, Non-causal version (ASPECT-PF-NC) (window length 8) (FIG. 4D), for T=500, h=0.01, and 1000 particles for each filter.

Figure 5:
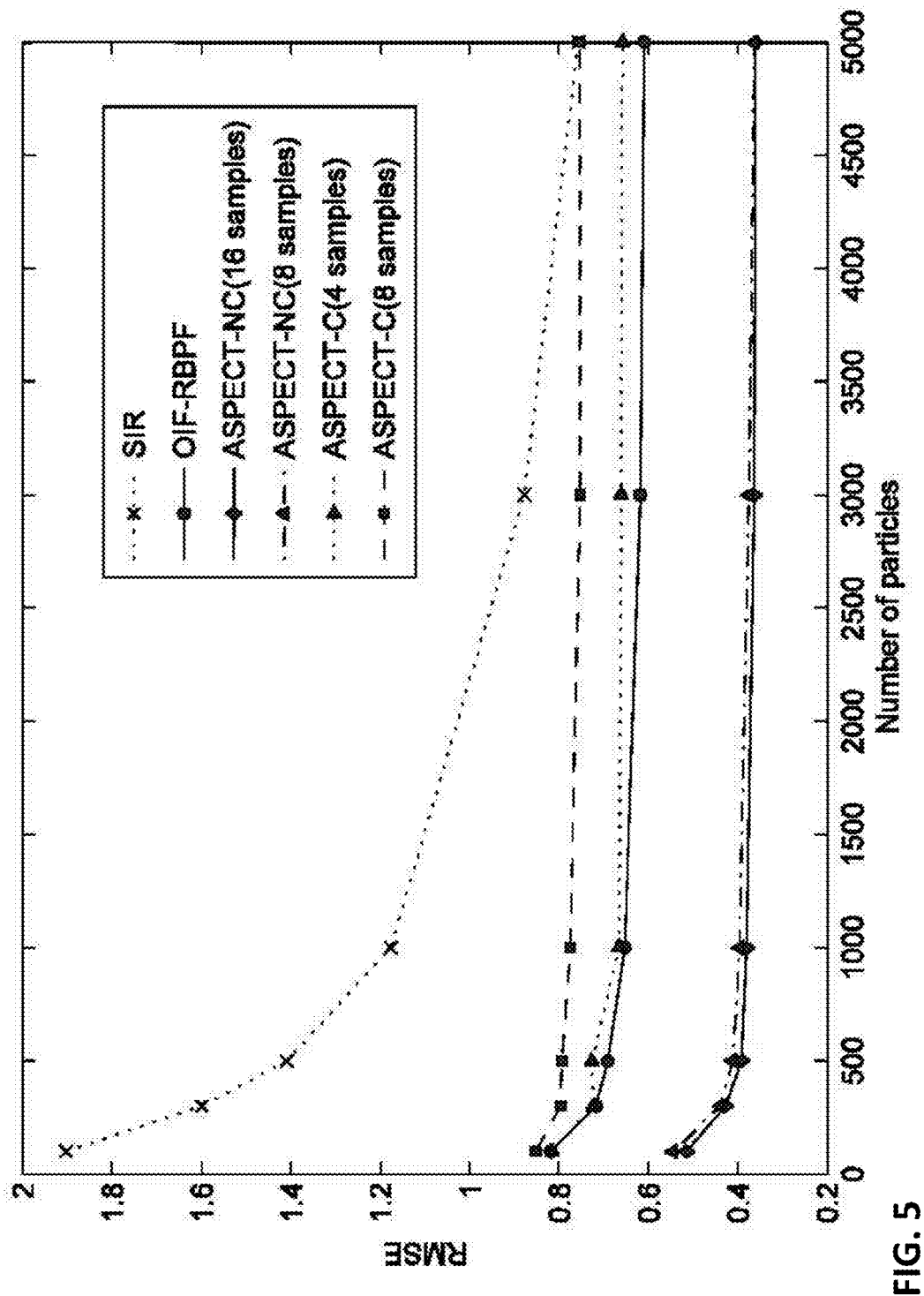
FIG. 5 is an exemplary graph of Root Mean Square Error (RMSE) results for T (number of temporal signal snapshots)= 300, h=0.02 (his hop probability per sample interval), and 500 Monte-Carlo (MC) trials.

FIG. 5 shows the root mean square error deviation Root Mean Square Error (RMSE) results for the aforementioned PF algorithms, for T=300 (T is the number of temporal signal snapshots) and h=0.02 (h is hop probability per sample interval) as a function of the number of particles. The performance of SpE is a constant, given in the caption for clarity. The results are averaged over 500 Monte-Carlo (MC) trials. The SIR (Sampling Importance Resampling Algorithm) is simple to derive and implement, however FIG. 5 shows that its RMSE performance leaves much to be desired. OIF-RBPF is the best causal filter, but ASPECT-PF-C is not far from it. The comparison of ASPECT-PF-NC to the causal filters is of course not on equal footing; still, it is interesting to see the kind of improvement possible when one can afford a little delay.

Measured Data

The algorithms were further tested using measured frequency hopping (FH) data, made available by Telcordia Technologies through the ARL Collaborative Technology Alliance (ARL-CTA) for Communications and Networks under Cooperative Agreement DADD19-01-2-0011. The measurement campaign was conducted in 2004, and comprised a diverse array of scenarios. The particular data that was used corresponds to a line-of-sight (LoS) scenario called T3-LoS. Over-the-air testing was performed using a software-defined radio and Agilent 4438 synthesizers; the carrier frequency was 1.875 GHz, with a two-sided bandwidth of 1.25 MHz; the signal bandwidth was 1 MHz. The received signal was sampled at 4 Ms/s with a 12-bit ADC. The (baseband) hopping bandwidth was from −0.5 to 0.5 MHz, divided into 32 equispaced frequency bins, and slow FH with binary Gaussian Minimum Shift Keying (GMSK) modulation was used. The maximum modulation-induced frequency deviation was $\frac{1}{128}$-th of the FH bin width.

The transmitted waveform was known, and included a long synchronization preamble, which also affords accurate channel estimation. The received signal was down-converted and oversampled at the receiver by a factor of 4. This compresses the frequency variation to a quarter of the band, and is (grossly) inconsistent with the preferred model; therefore the signal was sub-sampled prior to processing by a factor of 4. The end result is a full-band SFH GMSK signal with 128 samples per dwell, from which we extracted a segment comprising 2000 samples.

Figure 6:
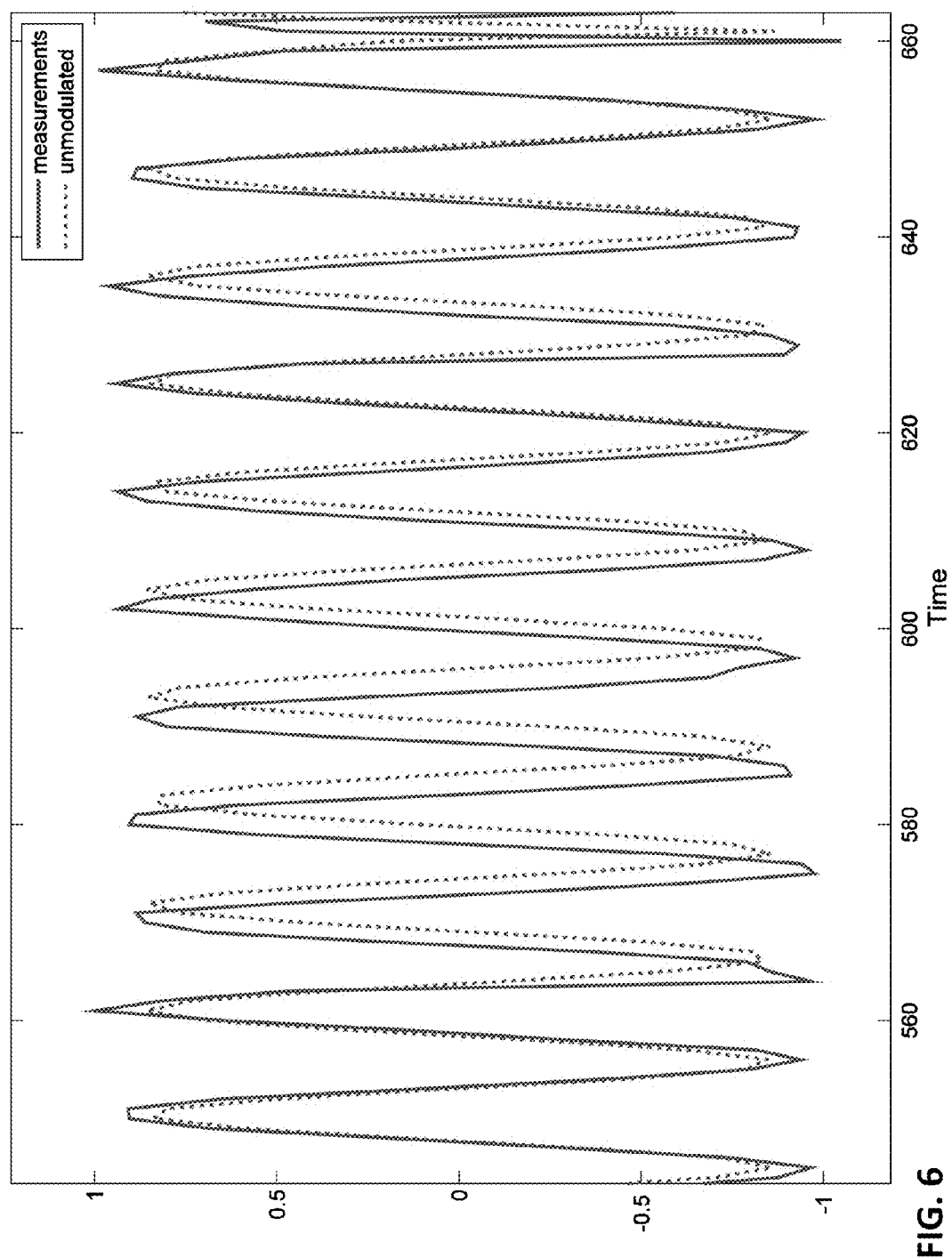
FIG. 6 is a graph of one dwell of the transmitted carrier and the measured signal after synchronization, amplitude and phase correction. Notice the residual phase noise due to modulation.
Figure 7:
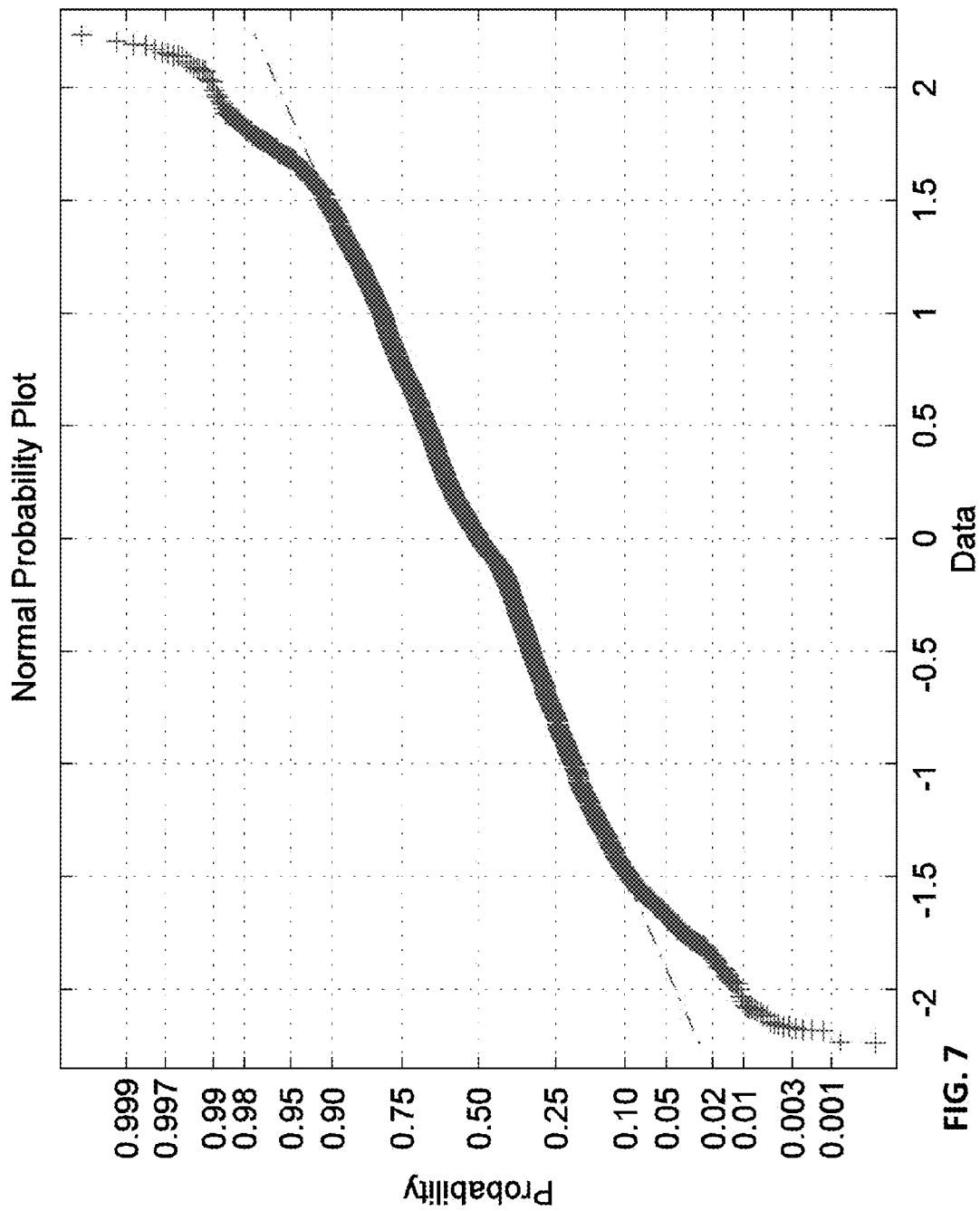
FIG. 7 is a normal probability plot of the real part of the residual signal (see text) for T (number of temporal signal snapshots)=2000 time steps. Notice the significant deviation from the Normal distribution in the tails, primarily due to carrier modulation.

There are many reasons why testing with measured data is important. The measured data violate several of the preceding assumptions, which is to be expected in practice:
  Due to the presence of a strong LoS component and only minor multipath, the signal's amplitude is approximately constant across dwells. This violates our i.i.d. Rayleigh fading assumption from dwell to dwell.
  Within a dwell, the frequency is not constant; it varies slowly due to GMSK modulation. This induces a time-varying residual phase noise relative to the true carrier. This is illustrated in FIG. 6, which shows one dwell of the unmodulated and the received signal after down-conversion to the hopping bandwidth, synchronization, amplitude and phase correction. The net effect is that the compound noise term is correlated and non-Gaussian. This is illustrated in FIG. 7, which shows a Normal probability plot of the real part of the noise signal. Notice the significant deviation from the Normal distribution in the tails.

Carrier hopping is not i.i.d. random as postulated in our model; it is periodic (without intentional jitter).

Finally, the parameters of our model (h, $\sigma_A^2$, $\sigma_n^2$) have to be estimated.

For the above reasons, trying our algorithms on the measured data is a meaningful test of robustness to model mismatch.

The hop period (dwell duration) $T_d$ can be accurately estimated from the spectrogram, or using cyclostationarity. Hop probability per sample interval was set to h=$1/T_d$=$1/128$. Given $T_d$, it is possible to segment the signal in fixed-length dwells using a serial acquisition search, and estimate the remaining parameters from the segments. $\sigma_A^2$=1 was used (to match the signal power), and $\sigma_n^2$=0.1.

Figure 8:
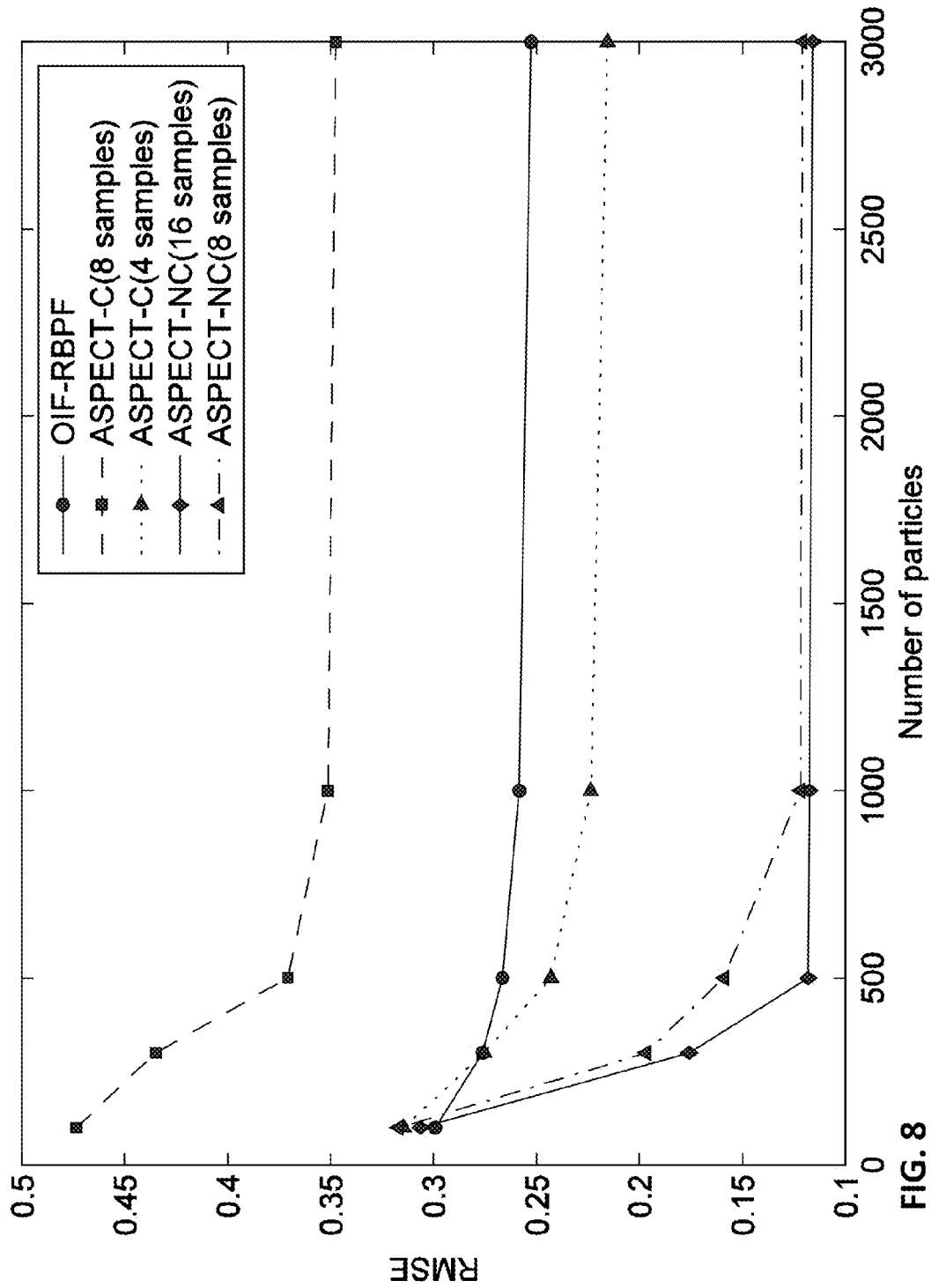
FIG. 8 is a plot of RMSE (root mean square error) results for the measured data: T (number of temporal signal snapshots)=2000, h=1/128 (h is hop probability per sample interval). The spectrogram estimator (SpE) with optimized window length (8) yields an RMSE of 0.32.

The results of experiments using measured data are summarized in FIG. 8. Notice that ASPECT-PF-C with a window length of 4 samples outperforms OIF-RBPF in this model-mismatched case. ASPECT-PF-NC delivers excellent performance with as few as a few hundred particles. To appreciate this, consider the following back-of-the-envelope calculation. If a tracking algorithm misses a half-band hop of π rads by a single sample, but otherwise tracks the signal perfectly over a dwell of 128 samples, the associated RMSE will be approximately 0.27. Most hops are less than half-band, yielding lower RMSE in the same scenario; but there will also be errors over the duration of the dwell. This speaks for a key strength of PF solutions versus window-based methods (such as SpE): the ability to accurately track hop timing.

A preferred embodiment solves the problem of tracking a frequency-hopped signal of random dwell frequency and hop timing, when only the average hop rate and spread bandwidth are known to the receiver. The distinguishing novel features of this invention relative to the prior art include the following advantages (a) improved available time-frequency localization performance over all known alternatives, especially when a small decoding delay is allowed. This is the case in most applications; (b) robust tracking performance with respect to model mismatch; (c) complexity is linear in the number of temporal samples and the number of particles. Satisfactory performance is obtained with only a moderate number of particles, and its overall complexity is such that on-line hardware implementations can be readily envisioned in certain situations.

Known and Possible Uses

The invention can be employed for passive signal intelligence in a plurality of ways; including, but not limited to:
  to track, intercept, jam, and avoid adversary military communications;
  for collision avoidance in frequency-hopped cognitive radio; and
  Transmitter-receiver synchronization ("pairing") for FH transmissions subject to (unintentional) timing jitter (potential use in software radio).

As stated in the foregoing, a preferred embodiment of the present invention offers the improved available time-frequency localization performance over known alternatives, especially when a small decoding delay is allowed; which is the case in most applications. The tracking performance is robust with respect to model mismatch and its complexity is linear in the number of temporal samples and the number of particles. Performance is superior with only a moderate number of particles, and its overall complexity is such that on-line hardware implementations can be readily envisioned in certain situations.

Figure 9:
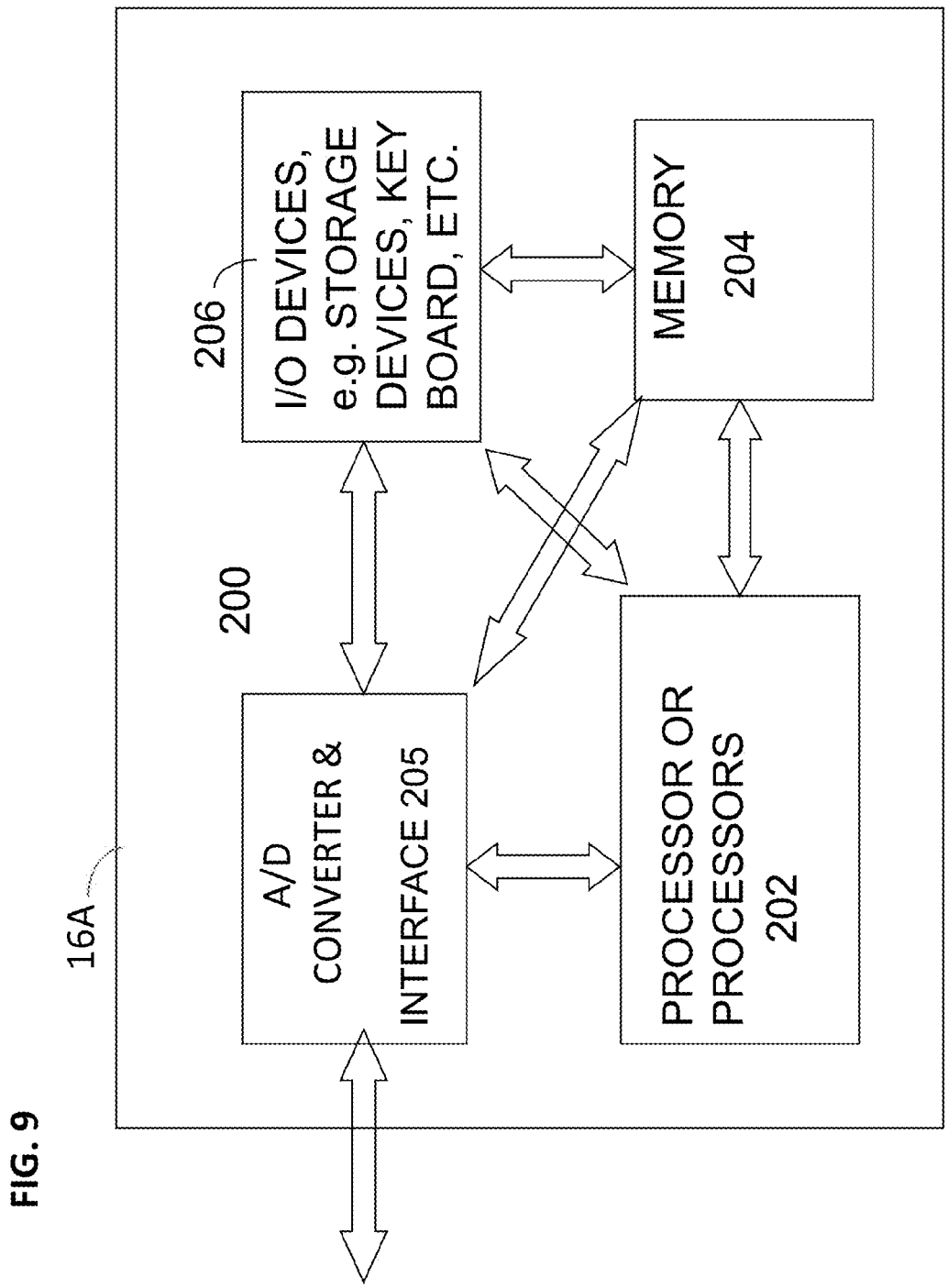
FIG. 9 depicts a high level block diagram of a general purpose computer suitable for use in performing the functions described herein.

FIG. 9 depicts a high level block diagram of a general purpose computer suitable for use in performing the functions described herein. As depicted in FIG. 9, the system 200 includes a processor element 202 (e.g., a CPU) for controlling the overall function of the system 200. Processor 202 operates in accordance with stored computer program code, which is stored in memory 204. Memory 204 represents any type of computer readable medium and may include, for example, RAM, ROM, optical disk, magnetic disk, or a combination of these media. The processor 202 executes the computer program code in memory 204 in order to control the functioning of the system 200. The computer code may include the program listing set forth in Appendix A. Processor 202 is also connected to an interface 205, which transmits and receives signal information or data. The interface may include an analog to digital converter. Also included are various input/output devices 206 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like)). A general purpose computer system such as that shown as 16A in FIG. 9 may be substituted for the channel monitor 16 of FIG. 2.

As used herein, the terminology "spectrogram" means an image that shows how the spectral density of a signal varies with time generated by a spectrograph or sonograph. Generally the spectrogram is a graph with two geometric dimensions: the horizontal axis represents time, the vertical axis is frequency; with a third dimension indicating the amplitude of a particular frequency at a particular time represented by the intensity or color of each point in the image. The creation of spectrograms can be accomplished using a series of bandpass filters or calculated from the time signal using the short-time Fourier transform (STFT). The STFT is calculated using digitally sampled data, in the time domain, broken up into portions, which usually overlap, and Fourier transformed to calculate the magnitude of the frequency spectrum for each portion. Each portions then corresponds to a vertical line in the image; a measurement of magnitude versus frequency for a specific moment in time.

The terminology "particle filtering" as used herein means the approximation of continuous distributions by discrete random measures, comprising "particles" and associated weights. In particle filtering (PF), a continuous distribution p(x) is approximated by a discrete random measure comprising "particles" (locations) $x_n$ and corresponding weights $w_n$ $$p(x) \approx \sum_{n=1}^{N} w_n \delta(x - x_n),$$

where δ(.) denotes the Dirac delta function. If the goal is to estimate the system state at time k from measurements up to and including time k, the key distribution of interest is the posterior density $p(x_k|\{y_i\}_{i=1}^{k})$. For example, particle filtering (PF) may start with a random measure approximation of the initial state distribution, and use subsequent measurements to estimate $p(x_k|\{y_l\}_{l=1}^{k})$, $k \in \{1, 2, \ldots\}$ in a sequential fashion, i.e., generate a sequence of random measure approximations $$p(x_k|\{y_l\}_{l=1}^{k}) = \sum_{n=1}^{N} w_{n,k}\delta(x-x_{n,k}).$$

As used herein, the terminology "mean square error" or MSE of an estimator is the quantification of the difference between an estimator and the actual signal being estimated. MSE corresponds to the expected value of the squared error loss or quadratic loss. MSE measures the average of the square of the "error." The error is the amount by which the estimator differs from the actual signal.

As used herein taking the square root of MSE yields the root mean squared error or RMSE.

As used herein the terminology "randomly hopped" or "random hop" encompasses pseudo randomly hopped.

The foregoing description details certain embodiments of the invention. It will be appreciated, however, that no matter how detailed the foregoing appears in text, the invention can be practiced in many ways, and is not intended to be limited to the specific examples described. For example, the particle sampling step can be parallelized, implemented in hardware, or split in multi-core processing units; the re-sampling step need not be performed in every iteration; and so on. It should also be noted that the use of particular terminology when describing certain features or aspects of the invention should not be taken to imply that the terminology is being re-defined herein to be restricted to including any specific characteristics of the features or aspects of the invention with which that terminology is associated.

APPENDIX A

A SAMPLE IMPLEMENTATION

```
%%%%%%%%%%%%%%%%%%%%%%%%%%%%%%%%%%%%%%%%%%%%%%%%%%%%
% Matlab implementation of ASPECT-PF (Auxiliary SPECTrogram Particle Filter)
%%%%%%%%%%%%%%%%%%%%%%%%%%%%%%%%%%%%%%%%%%%%%%%%%%%%
%%%%%%%%%%% Model is:
% x(t,:)=[omega(t) Aejphi(t)] % system state at time t
% evolves according to (see ffun.m):
% if rand < h % h is frequency hopping probability; assumed known
%    omega = 2*pi*rand – pi; % uniform in –pi, pi
%    Aejphi = randn+j*randn; % CN(0,2)
%    x(t+1,:) = [omega Aejphi];
% else
%    x(t+1,:) = x(t,:);
% end
% y(t) = x(t,2)*exp(j*x(t,1)*t)+v(t) % observation equation, see hfun.m
% v(t) is complex circular AWGN
%%%%%%%%%%%%%%%%%%%%%%%%%%%%%%%%%%%%%%%%%%%%%%%%%%%%
%%%%%%%%%% h = .01;          % Hopping probability (remember to change it in ffun
also if you like to test)
sigmaS = 10^(-6);     % generate particles around the spec/gram mode with variance sigmaS
WINDOW = 16;          % spectrogram window length
T = 500+WINDOW-1;     % Number of time steps.
N = 1000;             % Number of particles
sigma2 = .1;          % measurement noise variance
N_f = 256;            % # of points in FFTs
%%%%%%%%%%%%%%%%%%%%%%%%%%%%%%%%%%%%%%%%%%%%%%%%%%%%
%%%%%%%%%%
f_axis = 0:(2*pi/N_f):2*pi-(2*pi/N_f); % angular frequency axis
j = sqrt(-1);         % just in case it has been redefined elsewhere ...
% generate sample path and associated measured data:
x = zeros(T,2);
y = zeros(T,1);
x(1,:) = [1 1]; % Initial state.
for t=2:T
  x(t,:) = feval('ffun',x(t-1,:),t,-pi,pi); % ffun.m is the state transition function, see bottom
  y(t) = feval('hfun',x(t,:),t)+sqrt(sigma2)*(randn+j*randn); % hfun.m is the measurement
function, see bottom
end;
% spectrogram part:
estw = ones(1,T);    % estimated frequencies
aux = zeros(1,N_f);  % auxiliary array to hold the local FFTs(see below..)
for t=2:T-WINDOW+1,  % main loop
   aux = abs( fft( y(t:t+WINDOW-1) , N_f ) );
   [MFFT indx] = max(aux); estw(t) = f_axis(indx);
   if (estw(t)>pi) estw(t) = estw(t)-2*pi; end;
end; % end of t loop
% particle filtering part:
% initializations:
particles = ones(N,2);
w = ones(N,1);       % Importance weights
z = ones(N,1);       % aux vector, see weight update below
ind = (1:N)';        % index vector, see below
estx = ones(T,2);    % estimated (posterior mean) states
% main PF loop:
for t = 2:T-WINDOW+1,
  % sample from the importance function:
```

APPENDIX A-continued

A SAMPLE IMPLEMENTATION

```
hopind = zeros(N,1);
for n=1:N,
  d = rand;
  if d < h % hop
    hopind(n)=1;
    omega = estw(t) + sqrt(sigmaS)*randn; % generate around estw(t)
    Aejphi = randn + j*randn; % CN(0,2)
    particles(n,:) = [omega Aejphi]; % store the sample
  end;
end;
% particle weight update:
  for n=1:N,
    z(n,1) = feval('hfun',particles(n,:),t);
    if (hopind(n)==0),
      w(n,1) = exp(-0.5*inv(sigma2)*((real(y(t))-real(z(n,1)))^(2)))*exp(-0.5*inv(sigma2)*((imag(y(t))-imag(z(n,1)))^(2)));
    else
      w(n,1) = exp((particles(n,1)-estw(t))^2/(2*sigmaS))*exp(-0.5*inv(sigma2)*((real(y(t))-real(z(n,1)))^(2)))*exp(-0.5*inv(sigma2)*((imag(y(t))-imag(z(n,1)))^(2)));
    end;
  end;
  w = w + eps*ones(N,1); % alleviate "ill-conditioning"
  w = w/sum(w); % weight re-normalization
  % calculate posterior mean state estimates:
  estx(t,:) = w.' * particles ;
  % resampling (after resampling all weights implicitly set to one):
    rsind = multinomialR(ind,w)'; % resampled index vector
    particles = particles(rsind,:); % resampled particles
end;   % End of t loop.
function xnew = ffun(x,t,w_min,w_max);
% Process model function; includes process noise
h = 0.01; % frequency hopping probability
j = sqrt(-1);
d = rand;
if d < h % hop
    omega = (w_max-w_min)*rand + w_min ; % draw uniformly over [x_min,x_max]
    Aejphi = randn + j*randn; % CN(0,1)
    xnew = [omega Aejphi];
else
    xnew = x; % no hop
end
function y = hfun(x,t);
% Measurement model function; does not include measurement noise
j=sqrt(-1);
y = x(2)*exp(j*x(1)*t);
function outIndex = multinomialR(inIndex,q);
% PURPOSE : Performs the resampling stage of the SIR
%        in order(number of samples) steps.
% INPUTS : - inIndex = Input particle indices.
%          - q = Normalised importance ratios.
% OUTPUTS : - outIndex = Resampled indices.
% AUTHORS : Arnaud Doucet and Nando de Freitas - Thanks for the acknowledgement.
% DATE    : 08-09-98
if nargin < 2, error('Not enough input arguments.'); end
[S,arb] = size(q); % S = Number of particles.
% MULTINOMIAL SAMPLING:
% =====================
N_babies= zeros(1,S);
cumDist= cumsum(q');
% generate S ordered random variables uniformly distributed in [0,1]
% high speed Nicolas Bergman Procedure
u = fliplr(cumprod(rand(1,S).^(1./(S:-1:1))));
j=1;
for i=1:S
  while (u(1,i)>cumDist(1,j))
    j=j+1;
  end
  N_babies(1,j)=N_babies(1,j)+1;
end;
% COPY RESAMPLED TRAJECTORIES:
% ============================
index=1;
for i=1:S
  if (N_babies(1,i)>0)
    for j=index:index+N_babies(1,i)-1
      outIndex(j) = inIndex(i);
    end;
```

APPENDIX A-continued

A SAMPLE IMPLEMENTATION

```
      end;
   index= index+N_babies(1,i);
end
```

The invention claimed is:

1. A method for receiving a frequency hopping signal and estimating its parameters comprising:
   extracting discrete-time samples from the signal;
   creating a state-space vector sequence that captures an instantaneous frequency and a complex amplitude of the frequency hopping signal;
   selecting a parameter to represent the probability of hopping associated with the signal;
   generating a custom particle filter comprising an importance function with an associated weight updating scheme to approximate the posterior density of the instantaneous frequency and complex amplitude in the state-space vector sequence for succeeding time intervals using the extracted discrete-time signal samples up to a predetermined time;
   drawing random particles from the importance function for predetermined intervals of time using the associated weight updating scheme, the importance function having a closed-form mixture representation;
   using a mode of a local spectrogram to localize the frequency of new random particles drawn from the importance function, selecting new random particles around the peak frequency of the spectrogram for each interval of time, the importance function favoring drawing new particle frequencies biased close to the mode of the local spectrogram;
   applying weights derived from the associated weight updating scheme to the new random particles to create new weighted particle vectors;
   estimating the instantaneous frequency, and complex amplitude in the state-space vector sequence by averaging the instantaneous frequency and complex amplitude of the weighted particle vectors to thereby obtain an estimate of the instantaneous frequency and complex amplitude of the frequency hopping signal.

2. The method of claim 1 wherein the predetermined time is defined as time k and wherein random particles are drawn for predetermined intervals of time k+1 in seriatim.

3. The method of claim 1 wherein the step of applying the weights to the new random particles comprises using a weight function to multiply the particles by the weights based on the parameter selected corresponding to the dynamics of the frequency hopping comprises determining the particle weight update by:

$$w_{n,k} \propto w_{n,k-1} p(y_k | x_{n,k}) \times \times \begin{bmatrix} (1-h)\delta(\omega_{n,k} - \omega_{n,k-1})\delta(A_{n,k} - A_{n,k-1}) + \\ \dfrac{h}{2\pi} \dfrac{1}{2\pi\sigma_A^2} e^{-\dfrac{|A_{n,k}|^2}{2\sigma_A^2}} \\ \hline (1-h)\delta(\omega_{n,k} - \omega_{n,k-1})\delta(A_{n,k} - A_{n,k-1}) + \\ hp(\omega_{n,k}) \dfrac{1}{2\pi\sigma_A^2} e^{-\dfrac{|A_{n,k}|^2}{2\sigma_A^2}} \end{bmatrix}$$

where $\omega$ is the weight function, n represents the $n^{th}$ particle, k is the time, p is the probability, $y_k$ is the discrete time sample, x is the state space vector, $x_{n,k}$ is the state space vector for the $n^{th}$ particle at time k, h is the hop probability, $\delta$ is the Dirac delta, $\omega$ is the frequency, A is the amplitude, $\sigma$ is the variance; and if the frequencies are not equal ($\omega_{n,k} \neq \omega_{n,k-1}$ and $A_{n,k} \neq A_{n,k-1}$) then $$\omega_{n,k} \propto \omega_{n,k-1} \frac{\sigma_S}{\sqrt{2\pi}} \exp\left(\frac{(\omega_{n,k} - \hat{\omega}_k)^2}{2\sigma_S^2}\right) p(y_k | x_{n,k}),$$

else the weight update becomes indefinite due to the Dirac deltas, and the following is used:

$$\omega_{n,k} \propto \omega_{n,k-1} \frac{\sigma_S}{\sqrt{2\pi}} p(y_k | x_{n,k}).$$

4. The method of claim 1 wherein the step of generating custom particle filters comprises:
   approximating continuous distributions by discrete random measures, comprising particles and associated weights; and
   approximating at least one continuous distribution of interest as $$p(x) \approx \sum_{n=1}^{N} \omega_n \delta(x - x_n),$$

where $\delta()$ denotes the Dirac delta functional, $w_n$ is the weight, p is the probability.

5. The method of claim 1 wherein the step of drawing random particles from an importance function for predetermined intervals of time comprises using the following steps:
   letting $\hat{\omega}_k$ denote the mode of the spectrogram at time k, based on a causal window $\{y_{k-l+1}, \ldots, y_k\}$, and the function becomes:

$$(1-h)\delta(\omega_k - \omega_{n,k-1})\delta(A_k - A_{n,k-1}) + hp(\omega_k) \frac{1}{2\pi\sigma_A^2} e^{-\dfrac{|A_k|^2}{2\sigma_A^2}},$$

$$p(\omega_k) := \frac{1}{\sqrt{2\pi}\,\sigma_S} e^{-\dfrac{(\omega_k - \hat{\omega}_k)^2}{2\sigma_S^2}},$$

with $\sigma_s$ small (set to $10^{-3}$); and the particle weight update is given by:

$$w_{n,k} \propto w_{n,k-1} p(y_k | x_{n,k}) \times$$

-continued $$\begin{bmatrix} (1-h)\delta(\omega_{n,k}-\omega_{n,k-1})\delta(A_{n,k}-A_{n,k-1}) + \frac{h}{2\pi}\frac{1}{2\pi\sigma_A^2}e^{-\frac{|A_{n,k}|^2}{2\sigma_A^2}} \\ \hline (1-h)\delta(\omega_{n,k}-\omega_{n,k-1})\delta(A_{n,k}-A_{n,k-1}) + hp(\omega_{n,k})\frac{1}{2\pi\sigma_A^2}e^{-\frac{|A_{n,k}|^2}{2\sigma_A^2}} \end{bmatrix}$$

and, if $\omega_{n,k} \neq \omega_{n,k-1}$, and $A_{n,k} \neq A_{n,k-1}$ then $$\omega_{n,k} \propto \omega_{n,k-1} \frac{\sigma_S}{\sqrt{2\pi}} \exp\left(\frac{(\omega_{n,k}-\hat{\omega}_k)^2}{2\sigma_S^2}\right) p(y_k \mid x_{n,k}),$$

else the weight update becomes indefinite due to the Dirac deltas, and the following is used $$w_{n,k} \propto w_{n,k-1} \frac{\sigma_S}{\sqrt{2\pi}} p(y_k \mid x_{n,k})$$

where ω is the weight function, n represents the $n^{th}$ particle, k is the time, p is the probability, $y_k$ is the discrete time sample, x is the state space vector, $x_{n,k}$ is the state space vector for the $n^{th}$ particle at time k, h is the hop probability, δ is the Dirac delta, ω is the frequency, A is the amplitude, $\sigma^2$ is the variance.

6. The method of claim 5 further comprising using a short look-ahead non-causal window, $\hat{\omega}_k$ computed from $\{y_k, \ldots, y_{k+l-1}\}$.

7. The method of claim 1 wherein the importance function is given by $$p(x_k \mid x_{n,k-1}, y_k) = \frac{p(y_k \mid x_k)p(x_k \mid x_{n,k-1})}{\int p(y_k \mid x)p(x \mid x_{n,k-1})dx}$$

wherein p is the probability, y is the discrete time sample signal, k is the time index, k−1 represents the previous time, x is the state space vector of the instantaneous frequency and the complex amplitude, $x_{n,k-1}$ is the particle n at time k−1 and the vertical bar represents the probability of the next state.

8. The method of claim 1 wherein the state space vector is a stochastic non-linear state-space vector and wherein the method is implemented on-line for tracking and intercepting an intentionally randomly hopped signal without knowledge of the hopping pattern.

9. A frequency hopping receiving system for receiving a frequency hopping signal comprising:
a receiver for extracting discrete-time samples from the signal;
a memory connected to the receiver for storing the extracted discrete-time samples from the signal;
at least one processor operatively connected to the memory for:
creating a state-space vector sequence that captures the instantaneous frequency and complex amplitude of the frequency hopping signal;
selecting a parameter to represent the probability of hopping associated with the signal;
generating a custom particle filter having an importance function and an associated weight updating scheme to approximate the posterior density of the instantaneous frequency and complex amplitude in the state-space vector sequence for succeeding time intervals using the extracted discrete-time signal samples up to a predetermined time, the importance function having a closed-form mixture representation;
drawing random particles using the importance function for predetermined intervals of time, and deriving weights using the associated weight updating scheme;
using the mode of a local spectrogram to localize the frequency of new random particles drawn from the importance function, selecting new random particles around the peak frequency of the spectrogram for each interval of time, the importance function favoring drawing new particle frequencies biased close to the mode of the local spectrogram;
applying the weights derived from the associated weight updating scheme to the new random particles to create new weighted particle vectors; and
estimating the instantaneous frequency, and complex amplitude in the state-space vector sequence by averaging the instantaneous frequency and complex amplitude of the weighted particle vectors to thereby obtain an estimate of the instantaneous frequency and complex amplitude of the frequency hopping signal.

10. The system of claim 9 wherein the at least one processor determines the hop frequency, and complex amplitude for collision avoidance in frequency-hopped cognitive radio.

11. The system of claim 9 wherein the at least one processor determines the hop frequency, and complex amplitude for at least one transmitter/receiver combination for frequency hopped transmissions subject to unintentional timing jitter.

12. The system of claim 9 wherein the at least one processor operates to generate particle filters by approximating continuous distributions by discrete random measures, comprising particles and associated weights; and approximating at least one continuous distribution of interest as $$p(x) \approx \sum_{n=1}^{N} \omega_n \delta(x - x_n)$$

where p is the probability, x is the state space vector of the instantaneous frequency and the complex amplitude, $w_n$ is the particle weight and where δ( ) denotes the Dirac delta functional.

13. The system of claim 9 wherein the at least one processor operates to generate particles using a spectrogram in conjunction with the importance function based on the fast Fourier transform, thereby offering a balance between accuracy and complexity.

14. The system of claim 9 wherein the processor estimates the instantaneous frequency and complex amplitude using the mean of the particle-based approximation of the conditional density as:
$\overline{\omega}_k = \Sigma_{n=1}^{N} w_{n,k} x_{n,k}(1)$, $\overline{A}_k = \Sigma_{n=1}^{N} w_{n,k} x_{n,k}(2)$, wherein $\overline{\omega}_k$ is the mean of the frequency, $w_{n,k}$ is the weight at time k, $x_{n,k}$ is the state vector for the particle n at time k, and $\overline{A}$ is the mean of the amplitude.

15. The system of claim 9 wherein the processor estimates hop timing by one of taking successive differences of $\overline{\omega}_k - \overline{\omega}_{k-1}$ and comparing the result to a threshold, or applying a more sophisticated edge detection procedure to the sequence of estimated frequencies $\{\overline{\omega}_k\}$.

* * * * *